United States Patent
Lin et al.

(10) Patent No.: US 6,522,560 B1
(45) Date of Patent: Feb. 18, 2003

(54) POWER SUPPLY APPARATUS

(75) Inventors: Wei-Ming Lin, Taoyuan (TW); Heng-Chia Fan, Jungli (TW); Ko-Yu Hsiao, Jungli (TW); Hsin-Liang Lin, Taoyuan (TW)

(73) Assignee: Delta Electronics, Inc., Taoyuan Shein (TW)

( * ) Notice: Subject to any disclaimer, the term of this patent is extended or adjusted under 35 U.S.C. 154(b) by 0 days.

(21) Appl. No.: 09/951,997

(22) Filed: Sep. 13, 2001

(51) Int. Cl.$^7$ .............................. H02M 5/42; G05F 1/40
(52) U.S. Cl. .............................................. 363/89; 323/282
(58) Field of Search ...................... 363/89, 127, 130, 363/90, 131, 132; 323/266, 272, 282, 285

(56) References Cited

U.S. PATENT DOCUMENTS

| | | | | |
|---|---|---|---|---|
| 4,245,286 A | * | 1/1981 | Paulkovich et al. | 363/21.01 |
| 4,302,717 A | * | 11/1981 | Olla | 323/282 |
| 4,468,723 A | * | 8/1984 | Hughes | 363/82 |
| 4,943,903 A | * | 7/1990 | Cardwell, Jr. | 363/97 |
| 5,336,985 A | * | 8/1994 | McKenzie | 323/266 |
| 5,457,624 A | * | 10/1995 | Hasting | 363/127 |

* cited by examiner

*Primary Examiner*—Rajnikant B. Patel
(74) *Attorney, Agent, or Firm*—John W. Eldredge; Stradling, Yocca, Carlson & Rauth

(57) ABSTRACT

A power supply apparatus comprises a switching circuit including a primary power train circuit, a main transformer and a secondary power train circuit for receiving and rectifying an input voltage, an output filter for providing an output voltage to a load, and a voltage feedback coupled in series between the output voltage and the input voltage, in which the voltage feedback circuit includes a feedback control circuit for detecting the output voltage and outputting a voltage feedback control signal in response to the output voltage, a control circuit for outputting a first oscillating signal to the primary power train circuit, a magnetic element coupled in series between the feedback control circuit and the control circuit for receiving a second oscillating signal from the control circuit and coupling the second oscillating signal to the secondary power train circuit to drive the secondary power train circuit to accomplish synchronous rectification and coupling the voltage feedback control signal to the control circuit, and a rectifier circuit coupled in series between the feedback control circuit and the magnetic element for rectifying the second oscillating signal into an auxiliary voltage for operating the feedback control circuit.

13 Claims, 11 Drawing Sheets

POWER SUPPLY APPARATUS

FIELD OF THE INVENTION

The present invention is generally in connection with a power supply apparatus, and more particularly, the present invention is in connection with a power supply apparatus of simplified circuit arrangement and miniaturized magnetic element dimension.

DESCRIPTION OF THE PRIOR ART

As depicted in FIG. 1, a switching regulator which functions as a basic power supply apparatus typically comprises a power stage circuit and a voltage feedback circuit. The power stage circuit principally includes a switching circuit comprising a main transformer $T_1$, a primary power train circuit 111, a control circuit 114 and two voltage switches $Q_1$ and $Q_2$. The primary power train circuit 111 is employed to receive an input voltage $V_{in}$ and provides an output voltage to the primary side $L_{11}$ of the main transformer $T_1$ in accordance with an oscillating pulse signal 112. The oscillating pulse signal 112 is provided by a primary control circuit 113 which is coupled to the primary power train circuit 111 and may preferably comprise a pulse width modulation integrated circuit (PWM IC), such as 3843 or 3844 series integrated circuit chip. The control circuit 114 is used to output switch control signals to respectively control the switch operation of the on/off states of the two voltage switches $Q_1$ and $Q_2$, whereby rectifying the voltage at the secondary side $L_{12}$ of the main transformer $T_1$ by means of the switch operation of the two voltage switches $Q_1$ and $Q_2$. The power stage circuit further comprises an output low-pass filter 115, which includes an inductor 1151 and a capacitor 1152 for providing a DC (direct current) output voltage $V_0$ to a load 110. The control circuit 114 which generates switch control signals to turn the transistor switches $Q_1$ and $Q_2$ on and off generally is driven by an oscillating pulse signal 119 to initialize its control function, in order that the voltage at the secondary side $L_{12}$ of the main transformer $T_1$ may be rectified in synchronization with the phase of the oscillating pulse signal 119.

Furthermore, for the purpose of stabilizing the output voltage $V_0$ of the switching regulator, a voltage feedback circuit is required to be coupled between the output voltage $V_0$ of the switching regulator and the input voltage $V_{in}$. The voltage feedback circuit comprises a secondary feedback control circuits 117 which detects the DC output voltage $V_0$ and generates a voltage feedback control signal in response to the output voltage $V_0$. The voltage feedback circuit further comprises a photo coupler 116 which is coupled in series between the secondary feedback control circuit 117 and the primary control circuit 113 for coupling the voltage feedback control signal to the primary control circuit 113 to actuate the voltage feedback control function of the primary control circuit 113. In this way, the DC output voltage $V_0$ can be insulated from the primary side $L_{11}$ and the secondary side $L_{12}$ of the main transformer $T_1$ by means of the photo coupler 116.

As explained above, in order to assure that the control circuit 114 which controls the on/off states of the voltage switches $Q_1$ and $Q_2$ can rectify the voltage at the secondary side $L_{12}$ of the main transformer $T_1$ to a desired voltage, an oscillating pulse signal 119 is needed to be applied to the control circuit 114 so that the control circuit 114 can rectify the voltage at the secondary side $L_{12}$ of the main transformer $T_1$ in synchronization with the phase of the oscillating pulse signal 119. The oscillating pulse signal 119 is typically transmitted from a driver transformer $T_2$ coupled with the primary control circuit 113. The primary side of the driver transformer $T_2$ receives an oscillating pulse signal from the primary control circuit 113, and at the same time an equivalent oscillating pulse signal 119 is induced on the secondary side of the driver transformer $T_2$. The induced oscillating signal 119 acts as a driving signal to drive the control circuit 114 to rectify the voltage at the secondary side $L_{12}$ of the main transformer $T_1$ by means of the switch operations of the voltage switches $Q_1$ and $Q_2$.

Still referring to FIG. 1, in order to startup the control function of the secondary feedback control circuit 117, an external auxiliary power source 118 is required to be connected to the secondary feedback control circuit 118 to provide sufficient power to initialize the secondary feedback control circuit 117. FIG. 2, FIG. 3 and FIG. 4 illustrate several modified circuit configurations of the switching regulator of FIG. 1. In FIG. 4, the photo coupler which is employed to isolate the DC output voltage $V_0$ of the switching regulator from the primary side $L_{11}$ and the secondary side $L_{12}$ of the main transformer $T_1$ is removed from the voltage feedback circuit, and a magnetic element $T_3$ is coupled between the primary control circuit 113 and the secondary feedback control circuit 117 for coupling the voltage feedback control signal from the secondary feedback control circuit 117 to the primary control circuit 113. A rectifier circuit 20 is further coupled in series between the magnetic element $T_3$ and the secondary feedback control circuit 117 for rectifying the voltage induced at the secondary side of the magnetic element $T_3$ into a DC voltage, and the rectified DC voltage is taken as the auxiliary power source for operating the secondary feedback control circuit 117.

Nonetheless, the performance of the photo coupler 116 is susceptible to the ambient temperature and incident light beam, and thus the mean time before value (MTBF) of the conventional power supply apparatus will get worsened gradually. In addition, the number of the magnetic elements in the power supply apparatus is a decisive factor for the size of the power supply apparatus. The more magnetic elements presented in a power supply apparatus, the larger size the power supply apparatus will occupy. Moreover, the large number of the magnetic elements in a power supply apparatus implicitly indicates that the circuit arrangement of the power supply apparatus will be much complicated, which might become a handicap of designing the power supply apparatus to fit the requirements of compactness and low-cost.

There is a tendency to look for a way to integrate the functionalities of driving the control circuit at the secondary side of the main transformer to carry out synchronous rectification, coupling the voltage feedback control signal to the control circuit at the primary side of the transformer, and providing the auxiliary power required to operate the feedback control circuit of the voltage feedback circuit, into an unitary magnetic element for use in a power supply apparatus.

SUMMARY OF THE INVENTION

In accordance with one aspect of the present invention, a power supply apparatus for regulating an input voltage to provide an output voltage to a load is provided and comprises a power stage circuit including a switching circuit for receiving and rectifying an input voltage and an output filter for providing an output voltage to a load, and a voltage feedback circuit coupled between the output voltage and the input voltage, wherein the voltage feedback circuit includes a feedback control circuit for detecting the output voltage and outputting a voltage feedback control signal in response to the output voltage, a control circuit for outputting a first oscillating signal to the switching circuit, a magnetic element coupled in series between the feedback control circuit and the control circuit for receiving a second oscillating signal from the control circuit and coupling the second oscillating signal to the switching circuit and coupling the voltage feedback control signal to the control circuit, and a rectifier circuit coupled in series between the feedback control circuit and the magnetic element for rectifying the second oscillating signal into an auxiliary voltage for operating the feedback control circuit.

The switching circuit may further comprises a main transformer, a first power train circuit coupled to the primary side of the main transformer and a second power train circuit coupled to the secondary side of the main transformer. Further, the load in accordance with a preferred embodiment of the present invention at least includes a capacitor. Also, in a preferred aspect of the present invention, both the first oscillating signal and the second oscillating signal are directed to an oscillating pulse signal. The first oscillating signal is applied to drive the first power train circuit to regulate the input voltage to provide a voltage to the primary side of the main transformer, and the second oscillating signal is applied to synchronize with the secondary power train circuit to rectify the voltage at the secondary side of the main transformer.

Now the other objects, the foregoing and other features and advantages of the present invention will be more clearly understood through the following descriptions with reference to the accompanying drawings, wherein:

DETAILED DESCRIPTION OF THE PREFERRED EMBODIMENT

Figure 1:
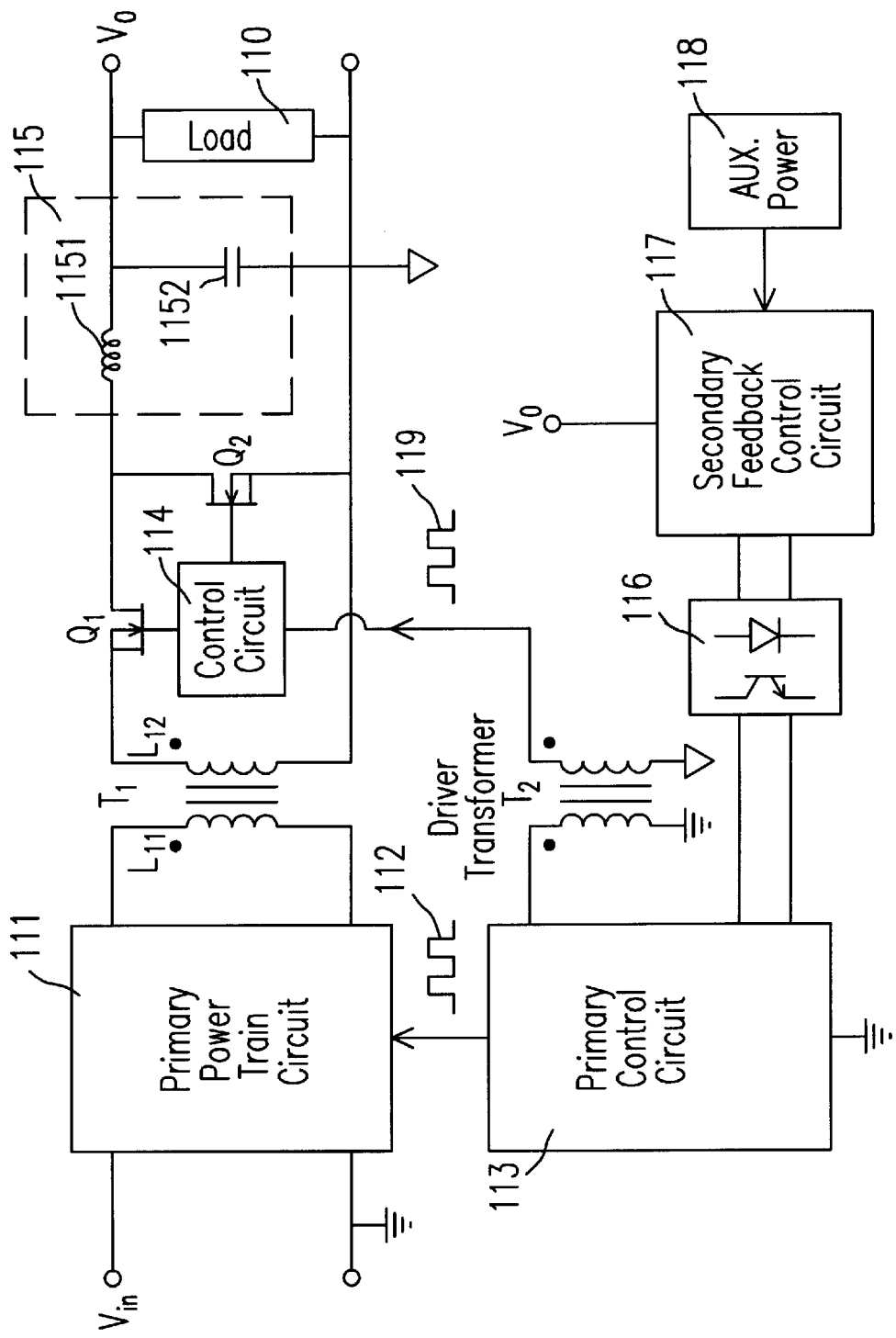
FIG. 1 schematically illustrates a circuit block diagram of a typical switching regulator according to the prior art.
Figure 2:
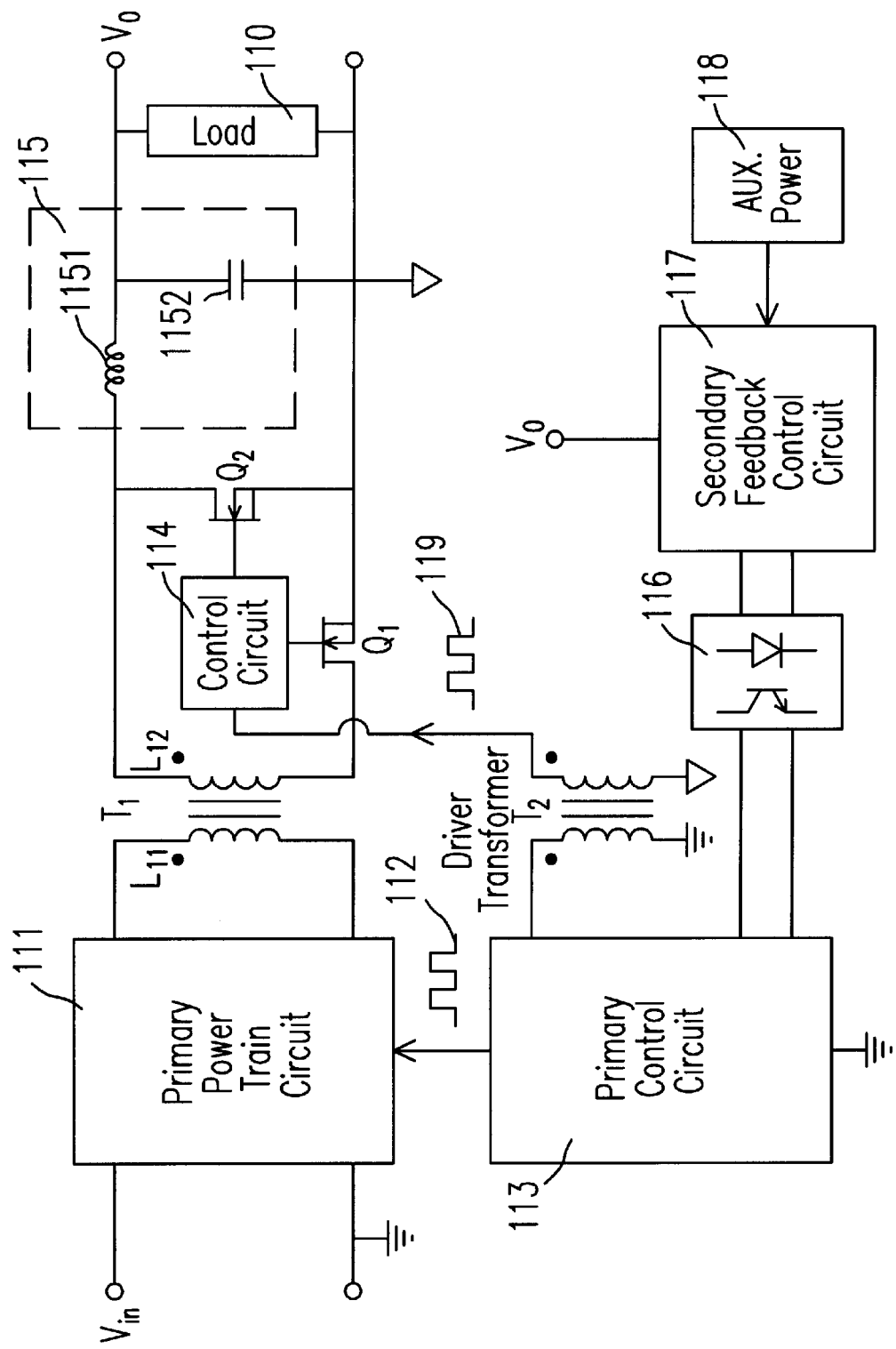
FIG. 2, FIG. 3 and FIG. 4 show several circuit block diagrams which are modified from the circuit configuration of the typical switching regulator of FIG. 1.
Figure 3:
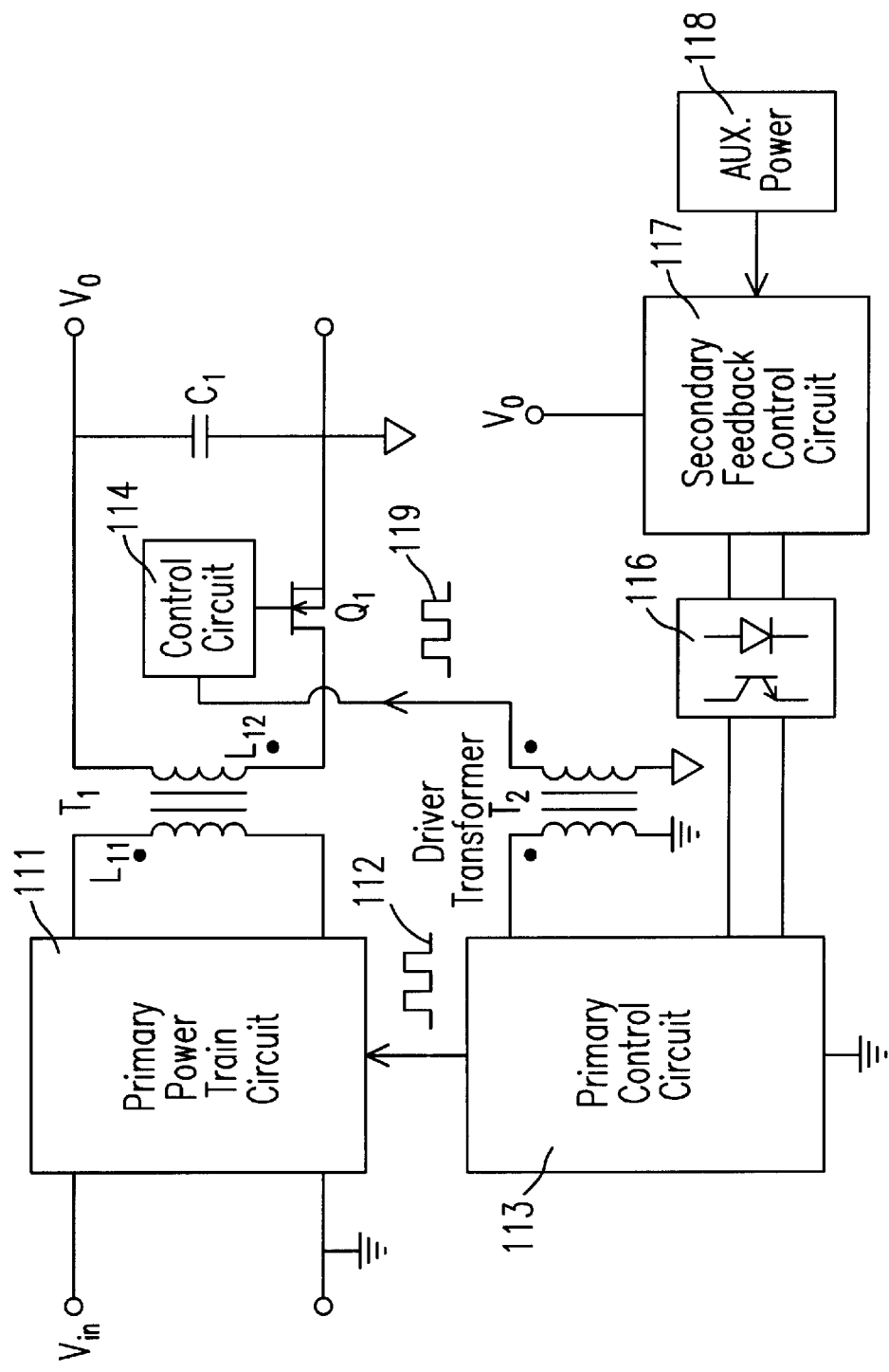
Figure 4:
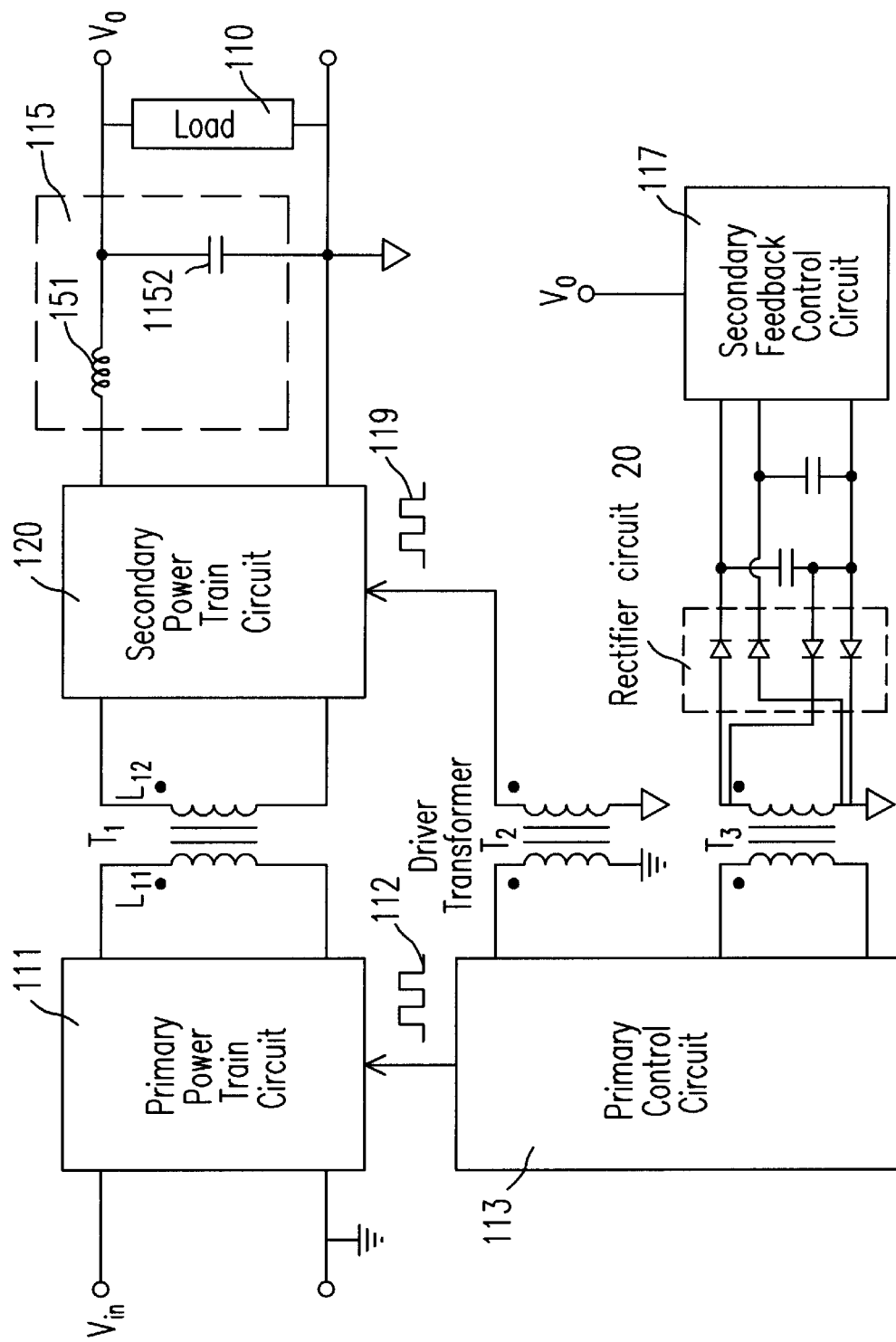
Figure 5:
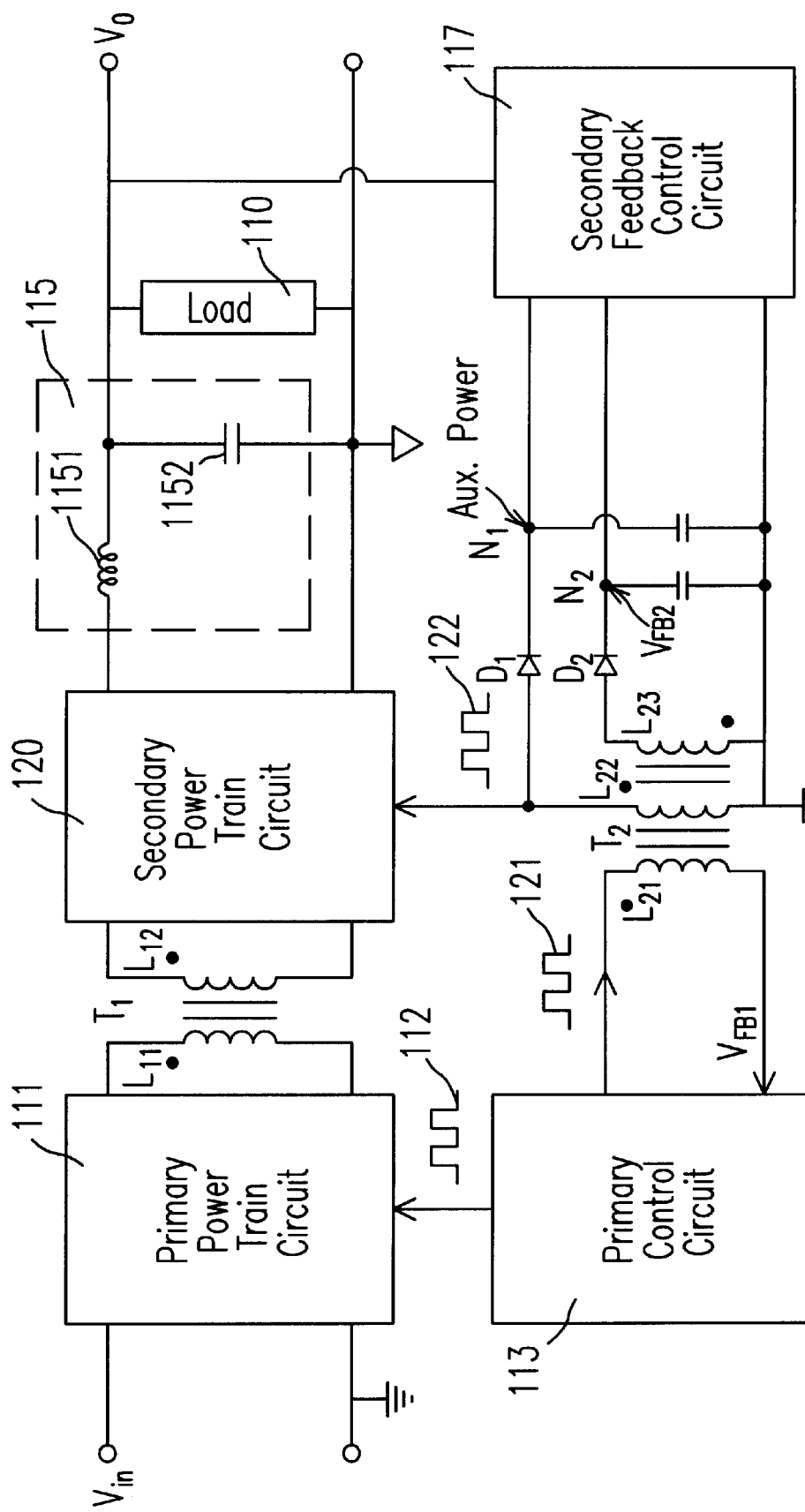
FIG. 5 depicts a first exemplary preferred embodiment of the switching regulator according to the present invention.
Figure 6:
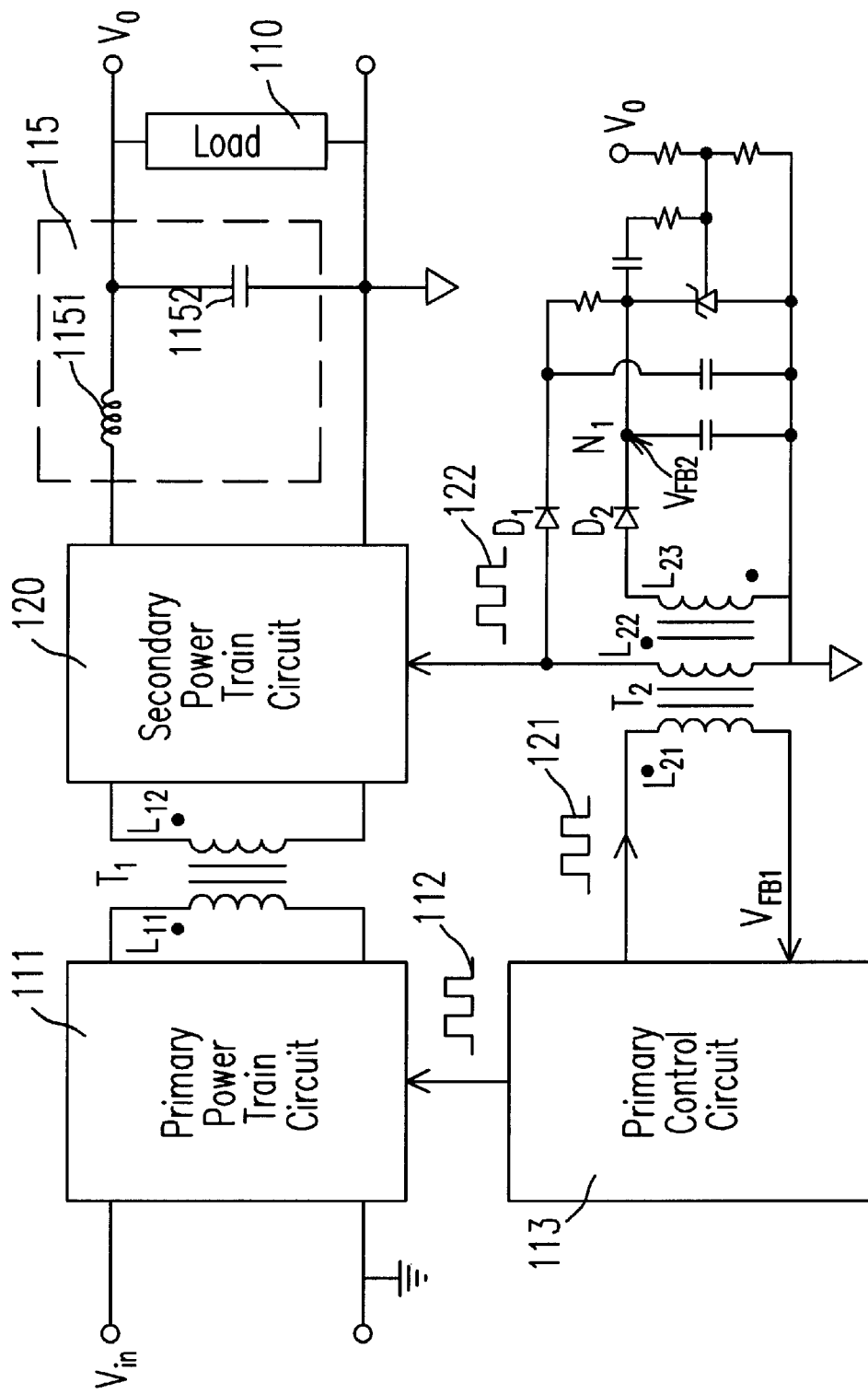
FIG. 6 to FIG. 11 demonstrate several embodiments of the switching regulator, in which an unitary magnetic element is incorporated into the voltage feedback circuit of the switching regulator.
Figure 7:
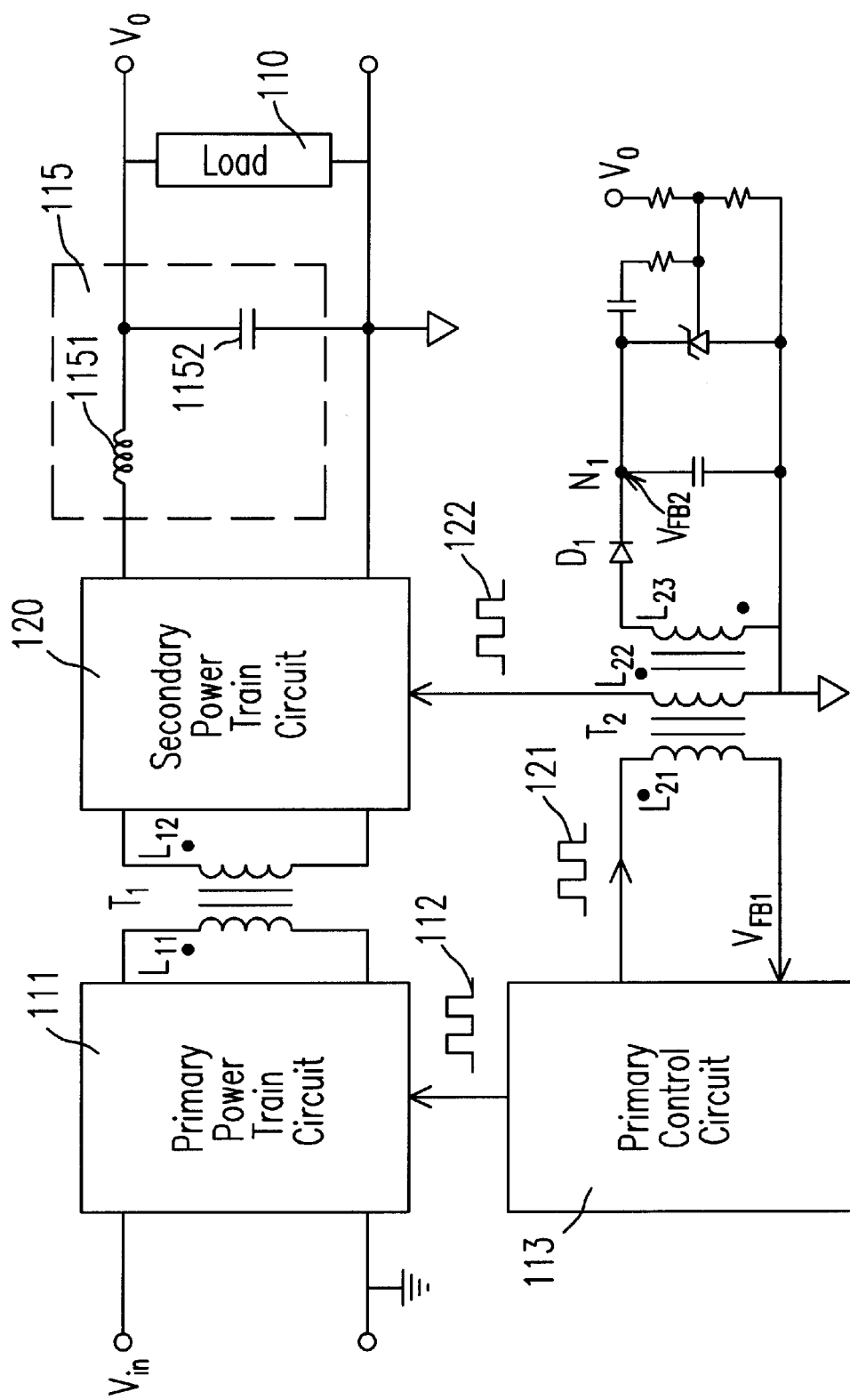
Figure 8:
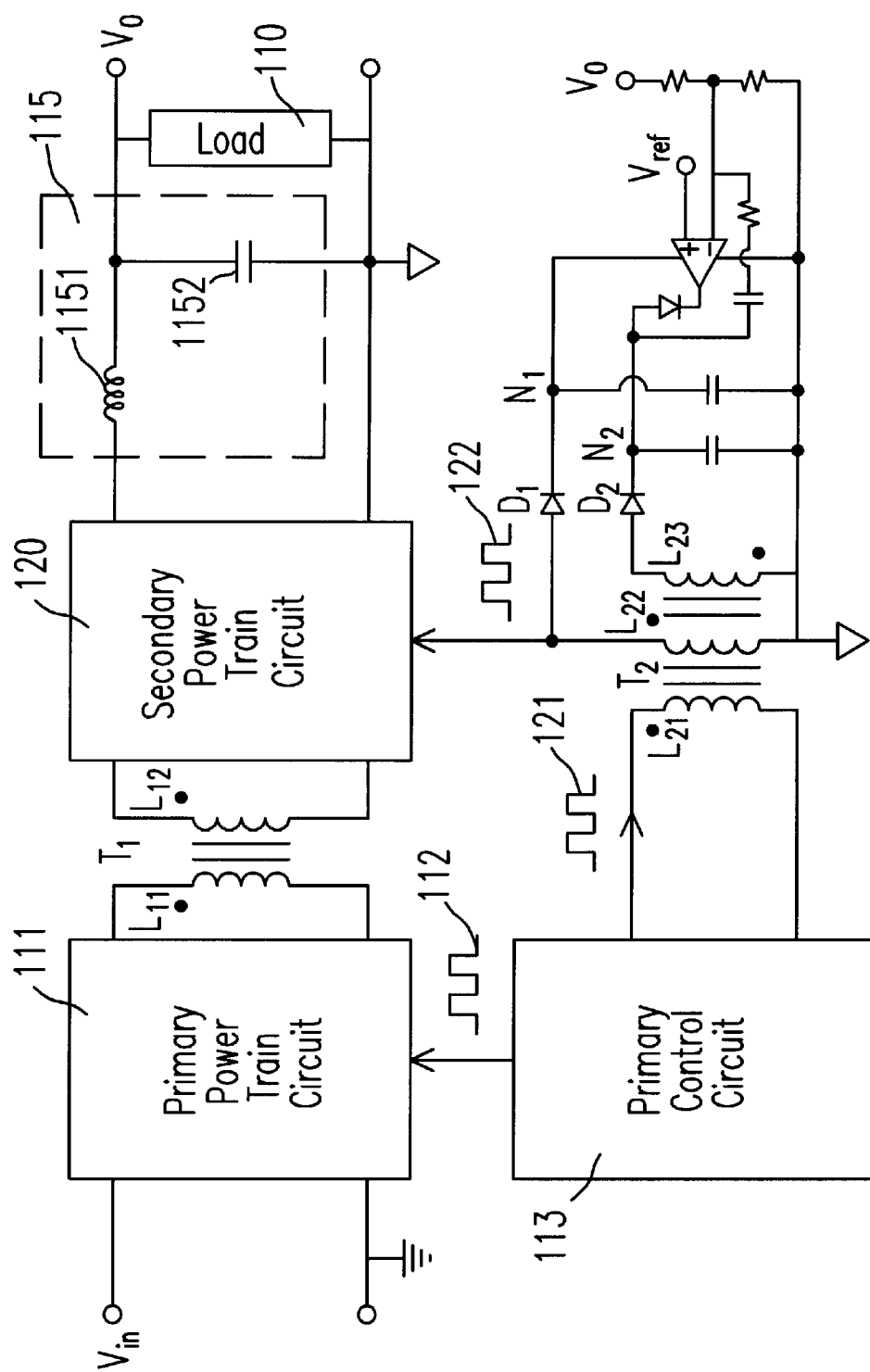
Figure 9:
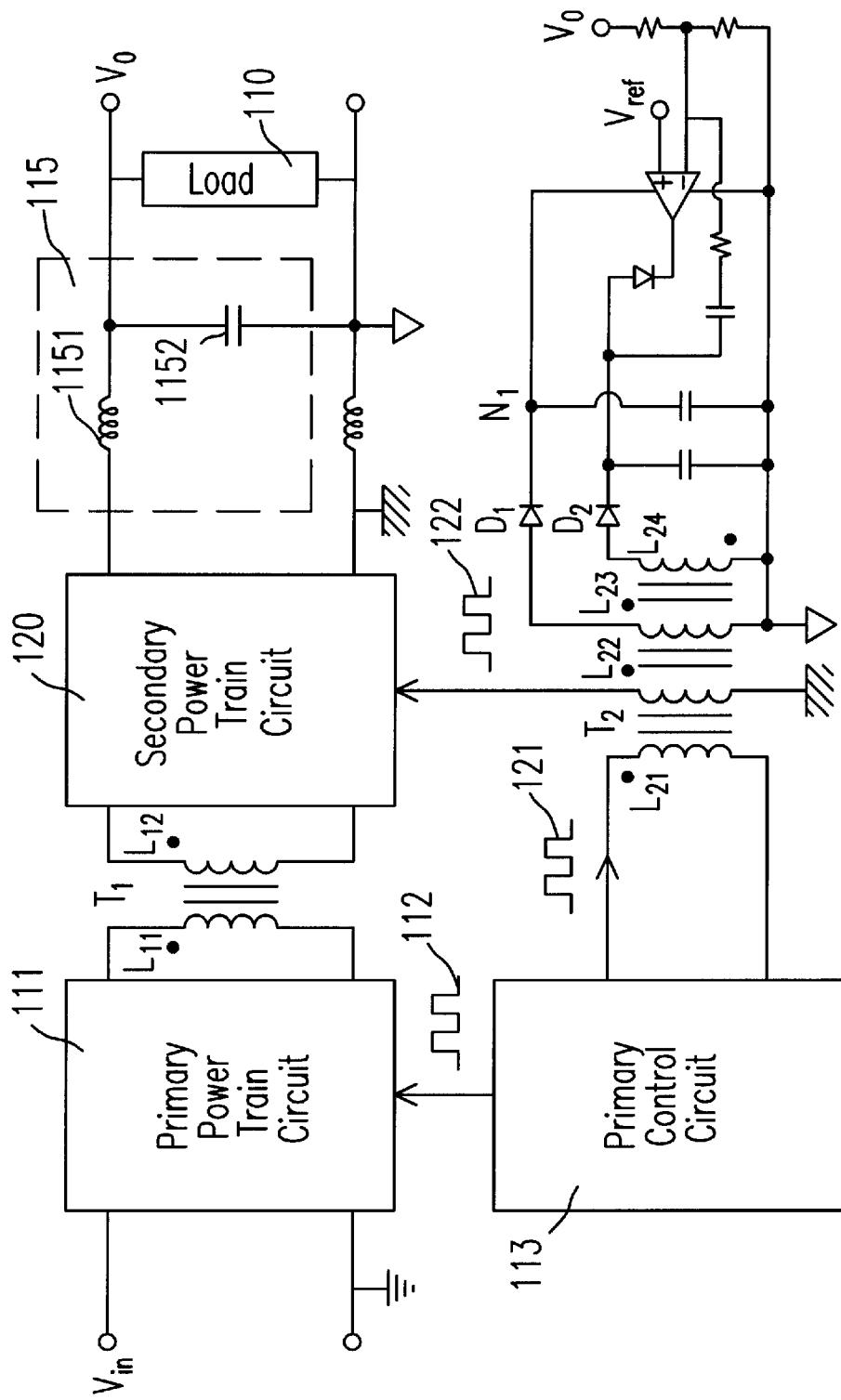
Figure 10:
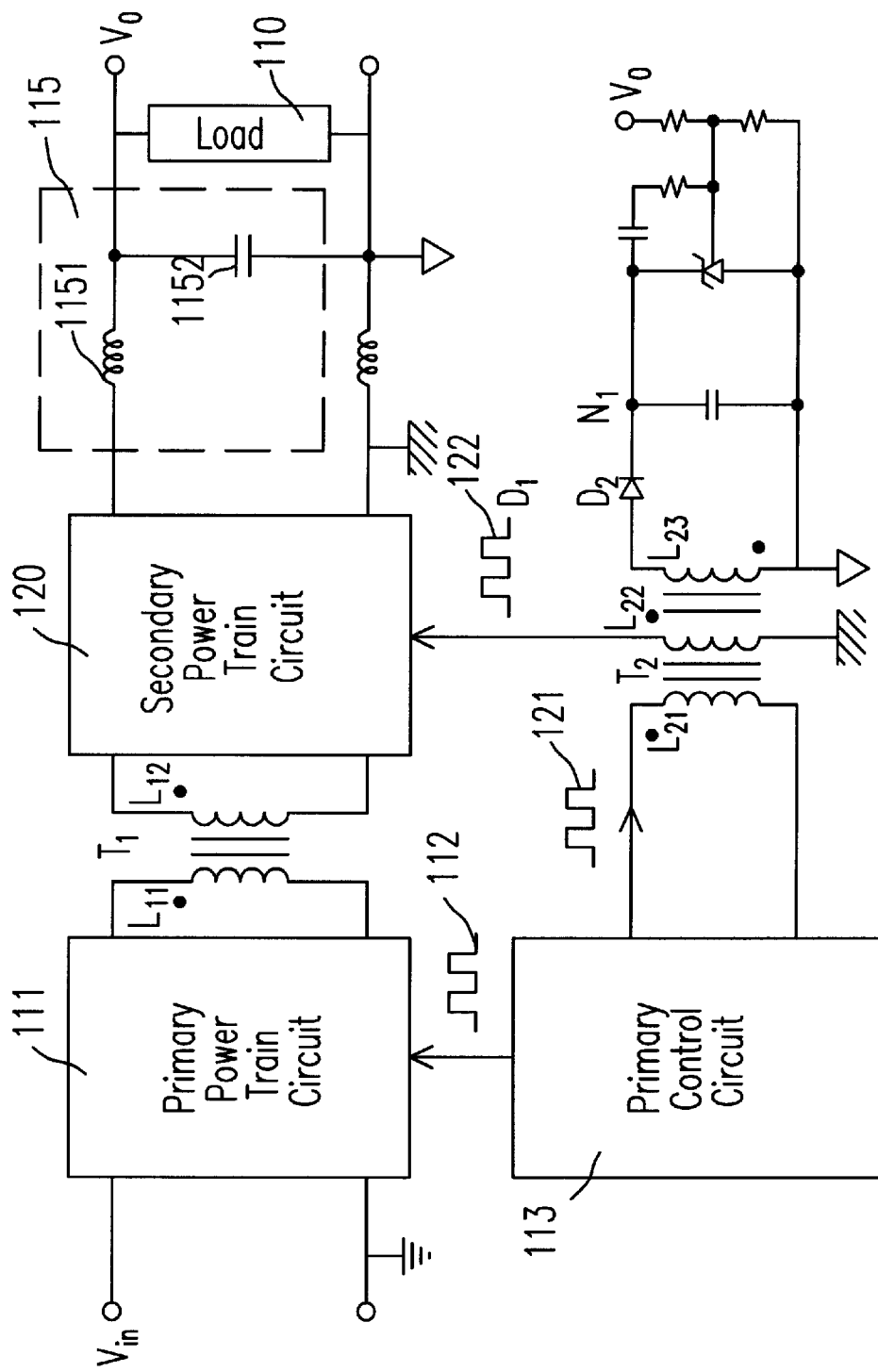
Figure 11:
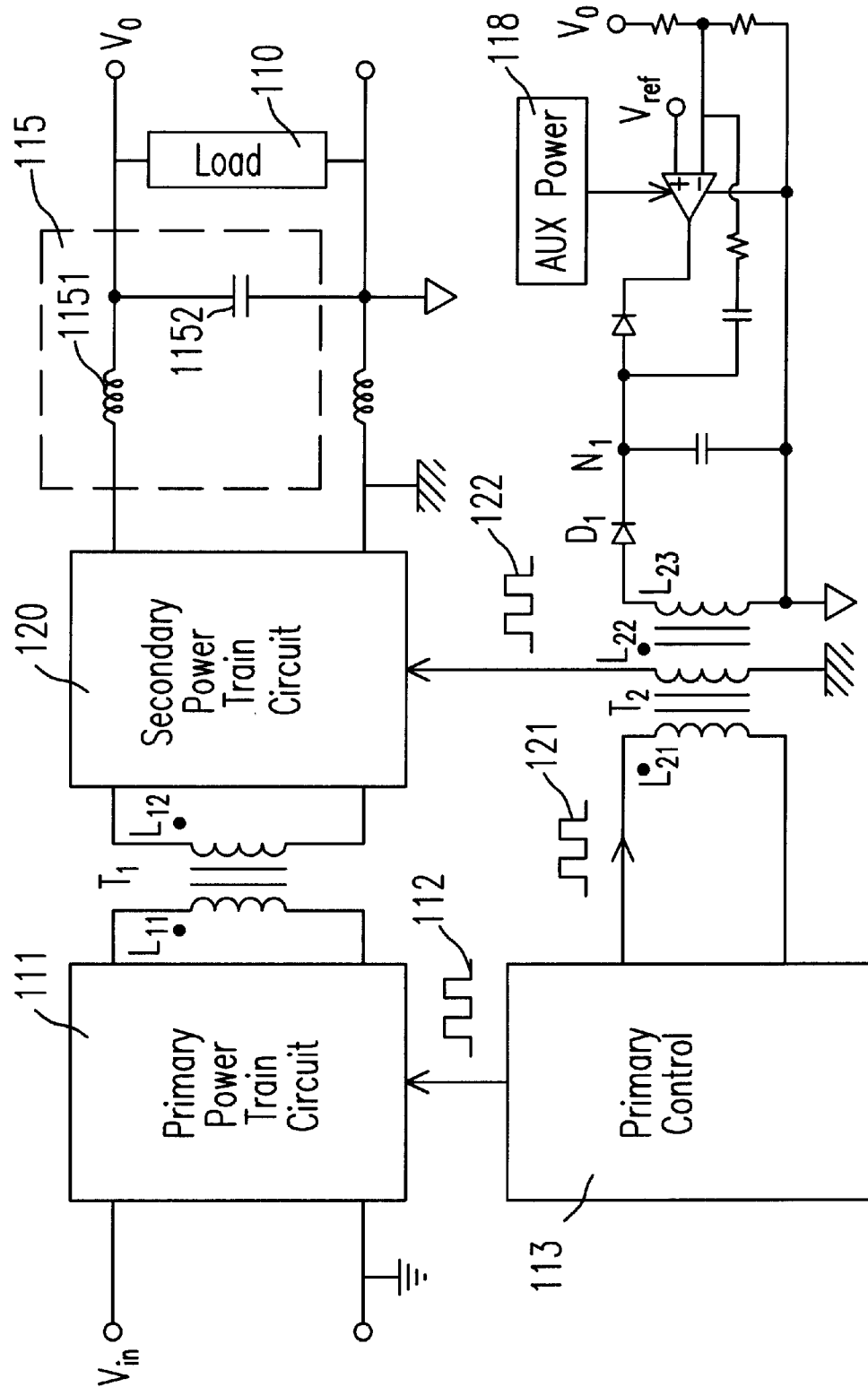

The power supply apparatus embodying the present invention will be illustrated by the following description and the drawings referred hereinafter. Referring now to FIG. 5, an exemplary embodiment of the switching regulator generally includes a power stage circuit and a voltage feedback circuit. The power stage circuit basically comprises a switching circuit including a main transformer $T_1$, a primary power train circuit 111 for receiving an input voltage $V_{in}$ and provides a voltage to the primary side $L_{11}$ of the main transformer $T_1$ according to a first oscillating pulse signal 112, and a secondary power train circuit 120. The primary control circuit 113 is provided for outputting oscillating pulse signals to the primary power train circuit 111 so that the primary power train circuit 111 can regulate the input voltage $V_{in}$ to output the desired voltage to the primary side $L_{11}$ of the main transformer $T_1$. The switching circuit further comprises a secondary power train circuit 120, typically it is consisted of a control circuit and a pair of voltage switches (not shown), and is configured to rectify the voltage at the secondary side $L_{12}$ of the main transformer $T_1$ to a desirable voltage. The secondary power train circuit 120 rectifies the voltage at the secondary side $L_{12}$ of the main transformer $T_1$ by means of the switch operation of the voltage switches in the secondary power train circuit 120. The switch operation of the voltage switches in the secondary power train circuit 120 is controlled by the control circuit of the secondary power train circuit 120. However, in order to activate the control function of the secondary power train circuit 120, an oscillating pulse signal 122 is essential for the secondary power train circuit 120 to drive the secondary power train circuit 120 to rectify the voltage at the secondary side $L_{12}$ of the main transformer $T_1$ in synchronization with the phase of the second oscillating pulse signal 122. The power stage circuit further includes an output filter 115 which is comprised of an inductor 1151 and a capacitor 1152 and is coupled between the secondary power train circuit 120 and a ground terminal to provide a DC output voltage $V_O$ to a load 110.

As discussed above, in order to stabilize the output voltage $V_O$ of the power supply apparatus, a voltage feedback circuit is needed to be located between the output voltage $V_O$ of the switching regulator and the input voltage $V_{in}$. In FIG. 5, the voltage feedback circuit is made up of a secondary feedback control circuit 117, the primary control circuit 113 as well as an unitary magnetic element $T_2$. The most conspicuous feature of the present invention will be highlighted with the unitary magnetic element $T_2$. With respect to the functionality and the style of circuit operation of the unitary magnetic element $T_2$, it will soon be understood by the following illustrations in conjunction with the drawings associated with the present invention.

As shown in FIG. 5, when an input voltage $V_{in}$ is fed to the primary power train circuit 111, the primary control circuit 113 will successively issue a second oscillating pulse signal 121 to the first winding $L_{21}$ of the unitary magnetic element $T_2$. At the same time, the primary control circuit 113 will issue a first oscillating pulse signal 112 to the primary power train circuit 111 to drive the primary power train circuit 111, and the second oscillating pulse signal 121 will lead in-phase with the first oscillating pulse signal 112. Then, an oscillating pulse signal 122 equivalent to the second oscillating pulse signal 121 will correspondingly be induced on the second winding $L_{22}$ of the magnetic element $T_2$. The oscillating pulse signal 122 will be transmitted to the secondary power train circuit 120 of the switching circuit to drive the secondary power train circuit 120 to rectify the voltage at the secondary side $L_{12}$ of the main transformer $T_1$ in synchronization with the phase of the second oscillating pulse signal 121. Further, the oscillating pulse signal 122 will be rectified by the diode $D_1$ (which functions as a rectifier circuit) into a DC voltage, and the rectified DC voltage indicated at the circuit node $N_1$ is utilized as the auxiliary power to operate the secondary feedback control circuit 117.

When the second oscillating pulse signal 121 which is coupled from the primary control circuit 113 to the secondary power train circuit 120 is turned off, the first winding $L_{21}$ of the unitary magnetic element $T_2$ starts to output a first voltage feedback control signal $V_{FB1}$ in an inverse phase relationship with the second oscillating pulse signal 121. In the mean time, a set of second voltage feedback control signal $V_{FB2}$ is created by means of the rectification operation of the rectifying diode $D_2$ at the circuit node $N_2$. The secondary feedback control circuit 117 which detects the magnitude of the DC output voltage $V_O$ will adjust the amplitude of the second voltage feedback control signal $V_{FB2}$ according to the detected DC output voltage $V_O$. In this manner, the amplitude of the first voltage feedback control signal $V_{FB1}$ will be affected, thereby the duty cycle of the first oscillating pulse signal 112 provided to the primary power train circuit 111 will be adjusted to accomplish the magnetic feedback operation.

As to FIG. 6 to FIG. 11, it is inclined to state that the circuit operation fundamentals and circuit topology are similar to those of the switching regulator of FIG. 5, and it is thought that there is no necessity to have a further discussion about the circuit operation and circuit arrangement of the switching regulator of FIG. 6 to FIG. 11 herein.

To the brief, the present invention provides an unitary magnetic element which is capable of providing an synchronizing signal to drive the secondary power train circuit to synchronously rectify the voltage at the secondary side of the main transformer, coupling the voltage feedback control signal from the feedback control circuit of the voltage feedback circuit to the control circuit at the primary side of the main transformer for stabilizing the output voltage of the power supply apparatus, and eliminating the demand of applying an external auxiliary power source to operate the feedback control circuit of the voltage feedback circuit. The present invention suggests a novel technique to integrate the functionalities provided by the photo coupler, driver transformer, and the external auxiliary power source into an unitary magnetic element, which is capable of reducing the complexity of the circuit design for the power supply apparatus and improving the MTBF of the power supply apparatus.

Those of skill in the art will recognize that various modifications can be made within the spirit and scope of the present invention as defined in the appended claims.

What is claimed is:

1. A power supply apparatus comprising:
   a power stage circuit comprising a switching circuit for receiving and rectifying an input voltage and an output filter for providing an output voltage to a load; and
   a voltage feedback circuit coupled between said output voltage and said input voltage, wherein said voltage feedback circuit includes a feedback control circuit for detecting said output voltage and outputting a voltage feedback control signal in response to said output voltage, a control circuit for outputting a first oscillating signal to said switching circuit, and a magnetic element coupled in series between said feedback control circuit and said control circuit for receiving a second oscillating signal from said control circuit and coupling said second oscillating signal to said switching circuit to rectify the input voltage synchronously and coupling said voltage feedback control signal to said control circuit.

2. The power supply apparatus as recited in claim 1, wherein said switching circuit comprises a main transformer, a first power train circuit coupled with a primary winding of said main transformer and a second power train circuit coupled with a secondary winding of said main transformer.

3. The power supply apparatus as recited in claim 1, wherein said output filter at least comprises one capacitor.

4. The power supply apparatus as recited in claim 1, wherein both said first oscillating signal and said second oscillating signal are an oscillating pulse signal.

5. A power supply apparatus comprising:
   a power stage circuit comprising a switching circuit for receiving and rectifying an input voltage and an output filter for providing an output voltage to a load; and
   a voltage feedback circuit coupled between said output voltage and said input voltage, wherein said voltage feedback circuit includes a feedback control circuit for detecting said output voltage and outputting a voltage feedback control signal in response to said output voltage, a control circuit for outputting a first oscillating signal to said switching circuit, and a magnetic element coupled in series between said feedback control circuit and said control circuit for receiving a second oscillating signal from said control circuit and coupling said second oscillating signal to said switching circuit to rectify the input voltage synchronously, and a rectifier circuit coupled in series between said feedback control circuit and said magnetic element for rectifying said second oscillating signal into an auxiliary voltage for operating said feedback control circuit.

6. The power supply apparatus as recited in claim 5, wherein said switching circuit comprises a main transformer, a first power train circuit coupled with a primary winding of said main transformer and a second power train circuit coupled with a secondary winding of said main transformer.

7. The power supply apparatus as recited in claim 5, wherein said load at least comprises a capacitor.

8. The power supply apparatus as recited in claim 5, wherein both said first oscillating signal and said second oscillating signal are an oscillating pulse signal.

9. The power supply apparatus as recited in claim 5, wherein said magnetic element is configured to couple said voltage feedback control signal to said control circuit.

10. A power supply apparatus comprising:
    a power stage circuit comprising a switching circuit for receiving and rectifying an input voltage and an output filter for providing an output voltage to a load; and
    a voltage feedback circuit coupled between said output voltage and said input voltage, wherein said voltage feedback circuit includes a feedback control circuit for detecting said output voltage and outputting a voltage feedback control signal in response to said output voltage, a control circuit for outputting a first oscillating signal to said switching circuit, and a magnetic element coupled in series between said feedback control circuit and said control circuit for receiving a second oscillating signal from said control circuit and coupling said second oscillating signal to switching circuit to rectify the input voltage synchronolously and coupleing said voltage feedback control signal to said control circuit, and a rectifier circuit coupled in series between said feedback control circuit and said magnetic element for rectifying said second oscillating signal into an auxiliary voltage for operating said feedback control circuit.

11. The power supply apparatus as recited in claim 10, wherein said switching circuit comprises a main transformer, a first power train circuit coupled with a primary winding of said main transformer and a second power train circuit coupled with a secondary winding of said main transformer.

12. The power supply apparatus as recited in claim 10, wherein said load at least comprises a capacitor.

13. The power supply apparatus as recited in claim 10, wherein both said first oscillating signal and said second oscillating signal are an oscillating pulse signal.

* * * * *